July 22, 1952
L. G. DUGGAR
2,604,529
SELSYN APPARATUS FOR NAVIGATIONAL SYSTEMS
Original Filed March 5, 1945
3 Sheets-Sheet 1
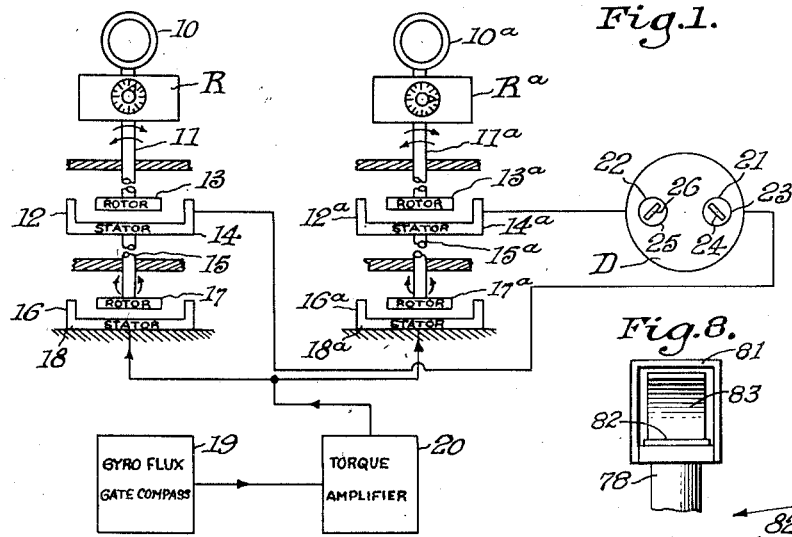
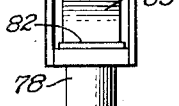
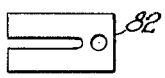
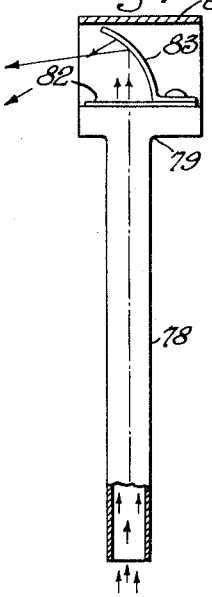
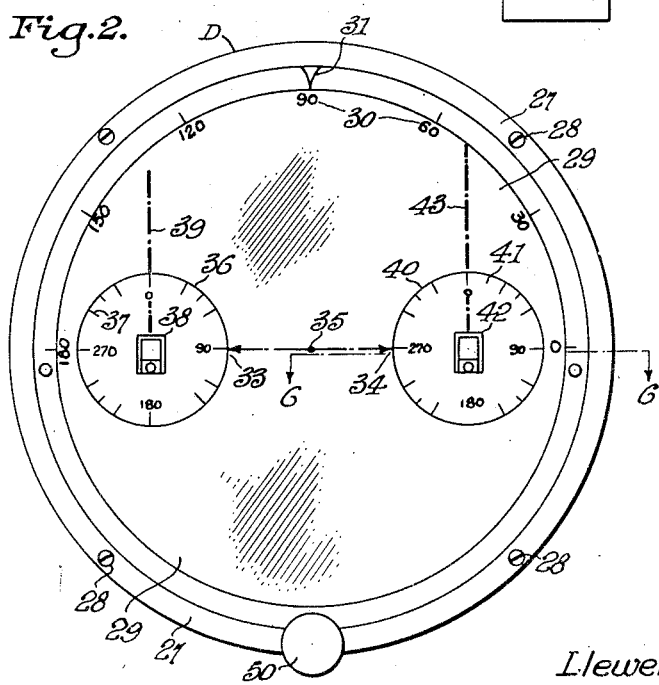
Inventor
Llewellyn G. Duggar
By Harry M. Saragovitz
ATTORNEY July 22, 1952  L. G. DUGGAR  2,604,529
SELSYN APPARATUS FOR NAVIGATIONAL SYSTEMS
Original Filed March 5, 1945  3 Sheets-Sheet 2
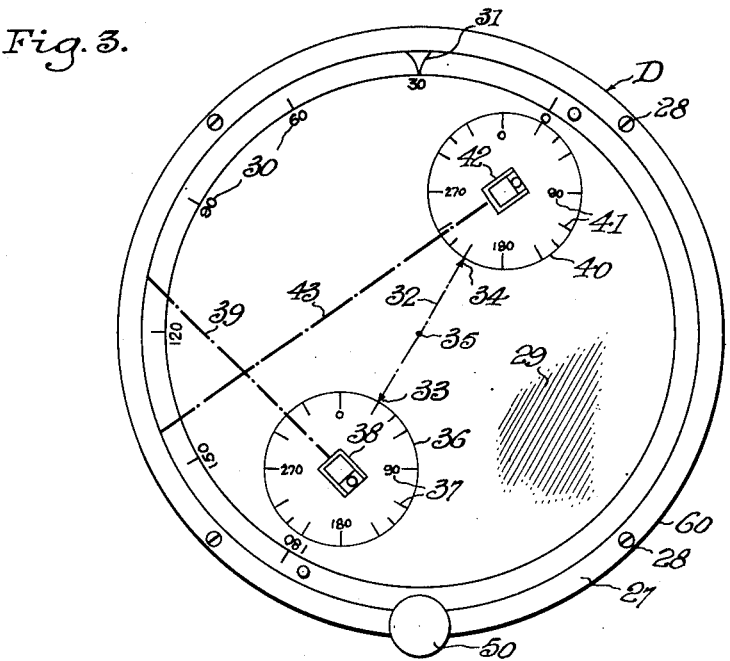
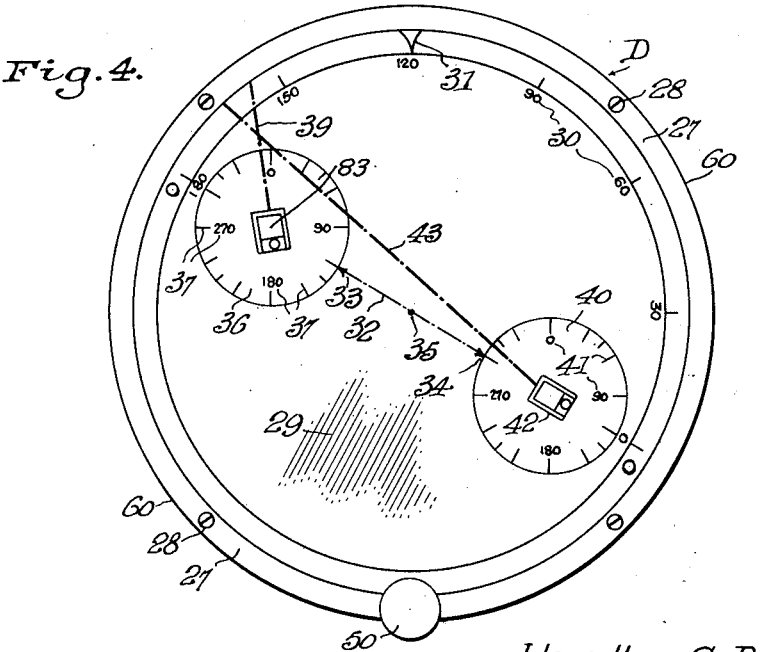
Inventor
Llewellyn G. Duggar
By Harry M. Saragovitz
ATTORNEY Inventor
Llewellyn G. Duggar
By Harry M. Saragovitz
ATTORNEY Patented July 22, 1952

2,604,529

UNITED STATES PATENT OFFICE 2,604,529

SELSYN APPARATUS FOR NAVIGATIONAL SYSTEMS

Llewellyn G. Duggar, United States Army

Original application March 5, 1945, Serial No. 581,012, now Patent No. 2,482,105, dated September 20, 1949. Divided and this application April 11, 1949, Serial No. 86,831

7 Claims. (Cl. 177—352)

(Granted under the act of March 3, 1883, as amended April 30, 1928; 370 O. G. 757)

This application is a division of my prior application, Serial No. 581,012, filed March 5, 1945, for Navigational System, now Patent 2,482,105, issued September 20, 1949.

The invention described herein may be manufactured and used by or for the Government for governmental purposes without the payment to me of any royalty thereon.

This invention relates to navigational systems and more particularly to visual aid devices in which there is obtained a graphic and continuous representation of the position of a craft in relation to known surrounding terrain, responsive to signals radiated from two or more sources of radiant energy at known fixed locations on the terrain. The specific embodiment of the invention is intended to be utilized in the kind of system disclosed in the above named prior application, and to overcome objections to, or add desirable functions in, such apparatus previously known.

The invention has certain objects stated in said prior application, and aims to aid in the attainment of certain objects of the improved system claimed in that application.

It is a particular aim to present an embodiment of apparatus which will be light, compact, and accurate, and which may be constructed at a minimum of expense, with a minimum liability of derangement incident to its normal use and which also may be readily maintained at low cost.

These and other objects and advantages will be readily apparent when the following specification is read in connection with the accompanying drawings in which:

Fig. 1 is a diagrammatic layout of my invention.

Fig. 2 is a front view of the indicating portion of my invention, showing the normal condition of the indicator when the device is not in action, the hoods 81 over the reflectors 83 being omitted.

Fig. 3 is a view of the indicating instrument as illustrated in Fig. 2 showing the position of the indicator when the craft is on an azimuth bearing of 315° from one radio station and 230° from the other radio station, the azimuth bearing of the axis line between the two radio stations being 30°.

Fig. 4 is a view of the indicating instrument as illustrated in Fig. 2 in which the indicator beams show a position of 120° azimuth for the axis line between the two radio stations with the craft on an azimuth of 350° with one station and 310° from the other station.

Fig. 7 is a detailed view partly in section of the Selsyn indicator light transmitting means.

Fig. 7a is a plan of the slotted screen in the light transmitting means of Fig. 7.

Fig. 8 is a fragmentary elevation of the light beam reflector element from the left of Fig. 7.

Figure 5:
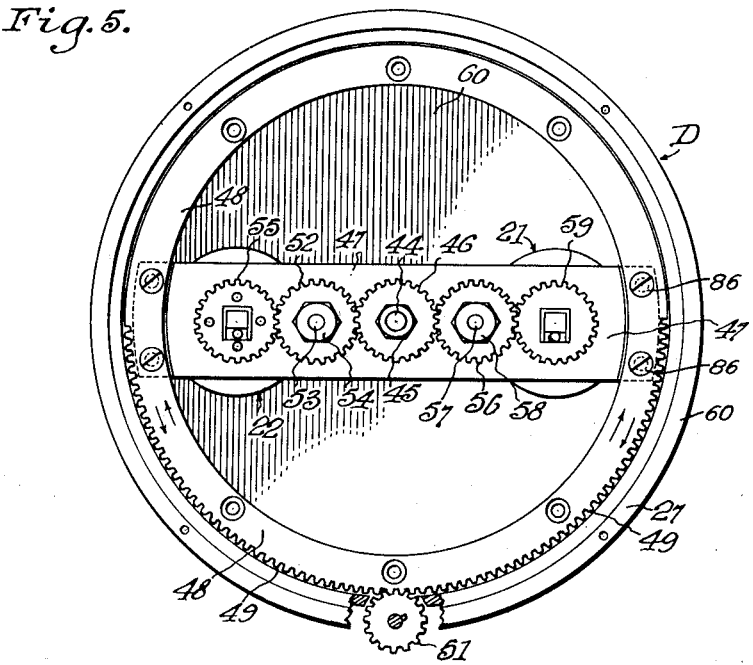
Fig. 5 is a view of the indicating instrument illustrated in Fig. 2 with the cover removed.

Due to the fact that the device known by the trade-mark name "Selsyn" was used in the embodiment of the invention disclosed herein, that name has been applied to the elements so involved in the disclosure, as a generic designation, as defined in my said patent.

Referring to Fig. 1, which illustrates a diagrammatic layout of my invention, it is seen that the reference numerals 10 and 10a refer to radio direction finder loop antennas of the type which are normally automatically rotated but may be hand rotated to various positions of azimuth. The loop antennas 10 and 10a are each utilized with a radio receiver R and Ra respectively whereby a bearing may be taken on one or more radio transmitters in a manner well known in the art. Since the particular structures of the antenna and of the radio receiver portion of the radio direction finder form no novel part of my invention, no detailed description thereof is given.

A pair of generator or transmitter Selsyns 12 and 12a, each having a rotor 13, 13a and a stator 14, 14a respectively, are so positioned with respect to each rotating loop antenna 10 and 10a that the loop antenna 10 is connected by a drive 11 (in this case a rotating mast or shaft) with the rotor 13 of the generator or transmitting Selsyn 12, and the loop antenna 10a is similarly connected by a shaft of a drive 11a to the rotor 13a of the Selsyn 12a. Thus the rotation of the loop antenna 10 will cause the generator Selsyn rotor 13 to assume the identical angular position for azimuth. In a similar manner the Selsyn rotor 13a will have the same angular position of azimuth as the loop antenna 10a.

The drives 11 and 11a may be direct mechanical drives, or, an electrical translating device such as a Selsyn may be utilized to transfer the rotational movement of the loop antenna to the rotor 13 or 13a of the transmitting Selsyn.

The stator 14 of the transmitting Selsyn 12 is not fixed but is mounted for rotation in either direction about an axis identical with that of the rotor 13.

In line with the generator Selsyn 12 there is positioned a large heavy-duty motor Selsyn 16, having a rotor 17 and a fixed stator 18. The stator 14 of the generator Selsyn 12 is connected by means of a drive 15 to the rotor 17 of the fixed heavy-duty motor Selsyn 16. The stator 18 of the heavy-duty motor Selsyn 16 remains fixed relative to its support, and the latter is rigidly fixed with the body of the craft. In a like manner the stator 14a of the generator Selsyn 12a is connected by means of a drive 15a to rotor 17a of a large heavy-duty motor Selsyn 16a, having a fixed stator 18a. Here again the drives 15 and 15a may be direct mechanical drives, or, electrical translating devices such as Selsyns may be utilized to transfer the rotational movement of the rotors 17 and 17a to the stators 14 and 14a respectively.

The field windings of the stator 18 and of the stator 18a are acted upon by the electrical output of a gyro flux gate compass 19 which is amplified in a torque amplifier 20 and fed commonly into the windings of each stator 18 and 18a. The gyro flux gate compass 19 and the torque amplifier 20 are of the type well known in the art in which the direction or heading of a craft is compared with a true north bearing or azimuth.

A compact visual dial instrument D, having two indicating Selsyns 21 and 22, Fig. 1, which will be described in more detail later, if situated in such a position in the craft as to be freely visible and accessible to the pilot or operator of a craft. The indicating Selsyns 21 and 22 are of the conventional type having a stator 23, 25 and a rotor 24 and 26, respectively. The stator 14 of the generator Selsyn 12 is connected in the usual manner to the stator 23 of the indicating Selsyn 21. Similarly, the stator 14a of the generator Selsyn 12a is connected to the stator 25 of the indicating Selsyn 22. Thus, the rotor 24 will assume the same bearing or azimuth of the generator Selsyn rotor 13 and loop 10 and the rotor 26 will independently assume the azimuth position of the rotor 13a and loop 10a.

By means of the construction related in the foregoing paragraphs, it is seen that the windings of the generator Selsyn stators 14 and 14a are affected not only electrically by the position of the rotors 13 and 13a and their antenna loops, but are also affected positionally by changes in azimuth of the Selsyn rotors 17 and 17a respectively. Thus the voltages fed into the stators 23 and 25 of the indicating Selsyns 21 and 22 are indicative not only of the positions of the rotors 13 and 13a respectively but also are indicative of the angular positions of the generator Selsyn stators 14 and 14a respectively, the generator stators 14 and 14a being in turn dependent for their angular position upon the position of the rotors 17 and 17a respectively of the heavy-duty Selsyns 16 and 16a.

Referring to Figure 2, which is a front view of the visual indicating portion of my invention (corresponding to the dial instrument D schematically shown in Fig. 1) which may be so situated or positioned in a craft that it is capable of easy visual access by the pilot or operator thereof, it is seen that the reference numeral 27 refers to a bezel plate which may be mounted upon a dash or instrument board by means of screws 28. A large circular dial or plat 29 having azimuth indicia 30 is so mounted as to permit rotation thereof to various angular positions. A pointer 31 upon the bezel 27 serves to give the angular position of the dial 29 as it is rotated to various positions. In the center of the large dial 29 a slender marker line 32 having arrows 33 and 34 is formed through its pivot axis 35 which will further indicate the azimuth of a base line connecting the two radio stations utilized for obtaining a "fix," as will be disclosed more fully later.

To the left of the dial pivot axis 35 in Fig. 2 there is situated a Selsyn azimuth indicating card 36 having azimuth markings 37 thereon. A reflected light source 38 which is rotated to various angular positions by an indicator Selsyn (as 22 in Fig. 1, not shown in Fig. 2) produces a beam of light 39. Similarly, to the right of the dial pivot axis 35 there is placed a Selsyn azimuth indicator card 40 having azimuth markings 41 thereon. A reflected light source 42 which may be rotated to various angular positions by an indicator Selsyn (as, 21 in Fig. 1, not shown in Fig. 2) produces a beam of light 43.

Referring to Fig. 5 which is a front view of the indicator portion of my invention with the dial 29 removed, it is seen that the reference numeral 44 refers to a center spindle fixed with the bezel 27, having mounted thereon a fixed central gear 46 held in position by a spindle nut 45. A support member 47 in the form of a cross beam diametrically arranged behind the dial 29, carries bolted thereto at 86 a cylindrical base ring gear 48 coextensive with the dial having external spur teeth 49 cut along the lower 190° of its perimeter. The support member 47 has a hub revoluble upon the fixed spindle 44 to permit rotation of the cylindrical ring gear 48 about the fixed spindle 44. Rotation of the gear ring 48 is accomplished by means of a small gear 51 mounted upon a hand knob 50 at the lower side of the apparatus.

To the left of the fixed gear 46 and meshing therewith is mounted on the cross-beam 47 an idler gear 52 mounted upon a stud shaft 53 by means of a spindle nut 54. To the left of the idler gear 52 and meshing therewith is a driven gear 55 having the same diameter as the fixed gear 46.

Similarly, to the right of the fixed gear 46 and meshing therewith is an idler gear 56 rotatably mounted upon a spindle bolt 57 and held thereto by the bolt head 58. To the right of the idler gear 56 and meshing therewith is a driven gear 59 having the same diameter as the fixing gear 46.

Rotation of the knob 50 rotates gear 48 about the spindle 44, carrying with it the cross-beam 47 and due to the two idler gears 52 and 56 meshing with the fixed gear 46, the two driven gears 55 and 59 are thereby oppositely rotated through an angle equal to that of the angular rotation of the ring gear 48. The dial 29 (Fig. 2) is fixed upon the ring gear 48 so that rotation of the latter rotates the dial 29 equally. The Selsyn indicator card 36 is mounted upon the driven gear 55 so as to rotate directly therewith. In a similar fashion the Selsyn indicator card 40 is mounted directly upon the driven gear 59 so as to rotate directly therewith. By the functioning of the idler gears, the gears 55 and 59 are rotated on the cross-beam 47 exactly enough to keep them and their cards, dials 36 and 40 oriented constantly in one relation to the direction of the pointer 31, although the reflectors 38 and 42 may be variously positioned on the same axis.

Figure 6:
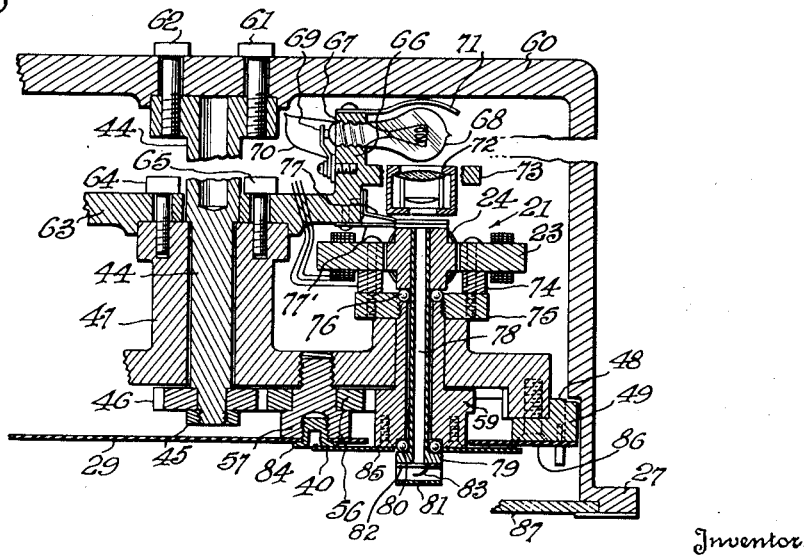
Fig. 6 is a fragmentary cross-sectional view along the line 6—6 of Fig. 2.

Referring to Fig. 6, it is seen that the reference numeral 60 refers to a casing in which the instrument is housed. The indicating instrument may be mounted in any suitable manner, as, for example, upon the instrument board of a craft or vehicle. Extending normally from the back wall of the casing is the stationary spindle 44, its foot flange fastened to said wall by bolts 61 and 62. Secured to the base of the hub of the cross beam 47 around the spindle 44 there is a rotating arm bracket 63 held on the hub by bolts 64 and 65. A right angle extension 66 of the bracket 63 contains an integral light bulb socket 67 in which is placed a small light bulb

68. An insulated spring contact member 69 serves to engage the center contact of the light bulb while the circuit is completed conventionally through the bracket, current being delivered through a cable 70. A concave reflector 71 reflects the light downwardly from the bulb through a set of condensing and collimating lenses 72, which are mounted upon an arm 73 of the bracket 63.

The stator 23 of indicator Selsyn 21 is mounted upon the base blocks 74—75, attached to an elongated tubular hub of the gear 59 so that the latter may rotate the stator, and serve as a bushing in the support 47 for the light tube 78 to be described. Ball bearings 76 are provided between the rotor 24 and hub of gear 59. Electrical connections are made to the indicator Selsyn rotor 24 by means of brushes 77 and 77' which are mounted upon the rotating arm bracket 63, one of which at least should be insulated. The leads to these brushes may be conventional and are not shown.

Passing through the center of the indicator Selsyn rotor and stator and securely attached to the rotor 24 there is a light conducting tube or shaft 78 the extreme lower end of which is broadened out to a shoulder 79 which rides upon the lower ball bearings 80. Mounted on the same end of the tube as the shoulder 79 and at right angles to the tube 78 there is a hood or housing 81 having a slotted screen 82 (Fig. 7) communicating with the interior of the tube 78. A reflector 83 mounted within the hood 81 serves to direct a narrow beam of light across the face of the dial or plat 29 from the beam of light passing downwardly through the tube 78 and narrowed by the slotted screen 82. See Figures 7 and 7A. Since the tube 78 is fastened to the indicator Selsyn rotor 24 and rotates therewith, it is seen that rotation of the indicator Selsyn rotor 24 will cause the beam of light which is reflected from within the tubular housing 81 to be angularly rotated an amount equal to the angular rotation of the indicator Selsyn rotor 24. The direction of the light beam issuing from the light conducting tube or shaft 78 may be changed by means other than that illustrated; for example, the reflector 83 may be replaced by a prism or by a mirror arrangement.

The dial 29 is mounted by means of a cover stud 84 screwed therethrough into the idler gear pivot 57 on the cross-member 47.

The dial 29 is formed with circular openings concentric with the axes of the gears 55 and 59, to receive hubs of these gears therethrough having end faces set just beyond the face of the dial, and the cards 36 and 40 are secured to these end faces of the hubs by screws as at 85 in Fig. 6, so that the cards lie in close parallel relation to the dial 29. The structure of the Selsyn indicating mechanism 22 is identical with that of the Selsyn indicator mechanism 21 as illustrated in Figure 6. The face of the entire indicating instrument is protected by a cover glass 87. Each tube 78 and reflector 83 being fixed with the rotor of the adjacent Selsyn, the light beam thus assumes an angular position over the dial which corresponds to the induced angular position of the stator thereby the combined radio beam input from 10 or 10a and from the gyro flux gate compass, plus or minus the movement put in by knob 50 manually. The latter may be clockwise or counterclockwise, according to the instant angular position of the craft's longitudinal axis in relation to longitude lines on the earth, and so the base line 32 will vary from its initial normal relation to the radius of pointer 31 shown in Fig. 2 by the value of input from knob 50. Without rotation of the knob, the combined input from the antenna 10 or 10a and gyro flux compass tends to introduce an error into the angular position of the beams 39 and 43 equal to the angular value of the input from the gyro flux compass, but the operation of the knob 50 to position the ring gear in relation to pointer 31 according to the true north angle derived either from a compass indicator or as above stated by computation from the known positions of the two ground stations in relation to true north, has the effect of subtracting angular movement error produced by the induction values derived from Selsyns 16 and 16a in the electrical input to the Selsyns 22 or 21. Consequently the geographical positions of the radio beams tuned in at the antennas 10—10a then become defined on the plat by the light beams 39 and 43; the relations of the light beams mutually and their relations to the actual radio beams have to each other and to a line on the earth between the two land stations where the radio beams originate. If a map is laid over or formed at the dial 29 on a scale which brings the points on the map representing the stations on the axes of the cards 36 and 40, the light beams 39 and 43 then have the same positions on the map which the radio beams from the land stations have in relation to the earth. The intersection of the beams 39 and 43 gives a "fix" representing the location of a point on the map or in relation to the line 32 which corresponds to the position of the craft over the earth.

A modification of the indicating instrument just described may be had by providing a transparent map overlying the cover glass 87 so that the pilot of a craft may actually mark his course on the map and so guide the craft that the intersection of the two light beams falls upon the marked course. Instead of providing a transparent map overlay, the image of a map may be projected upon the cover glass. By proper spacing of the projector, the scale of the map may be varied. A still further modification may be had in the provision of a fluorescent coating upon the inside of the cover glass 87 which will be excited by ultraviolet light emitted instead of the visible light source described.

To use the device, the radio antennae direction finders 10 and 10A are each rotated in the conventional manner and trained upon two known radio stations or beacons. The thumb screw 50 on the visual position indicator is then turned so that an indicated azimuth between the two light beam indicators 38 and 42 corresponds to that of the true north azimuth known to exist between the two ground radio stations or beacons being utilized. In this manner a similar triangle is established on the face of the indicating instrument which may be compared to the triangle drawn on a map showing the location of the two radio stations or beacons being used. The point of intersection of the two light beams 39 and 43 will show the position of the craft at all times. Furthermore, the scale of the instrument depends upon the proportion of the distance between the axes of the Selsyn indicators to the distance between the two radio stations or beacons.

Figure 3 illustrates the appearance of the dial of the indicating instrument when the base line connecting the two radio stations or beacons has an azimuth bearing of 30° and where the craft is on an azimuth bearing of 315° from one radio station or beacon and on an azimuth bearing of 230° from the other radio station or beacon. The intersection of the two light beams indicates the position of the craft with respect to the two radio stations or beams.

Figure 4 illustrates the appearance of the indicating instrument when the base line between the two radio stations or beacons has an azimuth bearing of 120° and where the craft lies on an azimuth of 350° from one of the radio stations and on an azimuth of 310° from the other of the radio stations.

Although I have illustrated one embodiment of my invention, it is obvious that many changes may be made without departing from the invention as defined by the appended claims.

I claim:

1. A visual indicating apparatus for use in a navigational system of the character described, a cylindrical ring having gear teeth on substantially half of its periphery, a support member bridging said cylindrical ring and rigidly secured thereto, a fixed gear positioned in the center of said support member, a pair of idler gears rotatably mounted on said support member and meshed with said fixed gear, a pair of driven planetary gears rotatably mounted on said support member and meshed with said idler gears; said fixed gear and driven gears all being of like diameter, means to rotate the ring to conform to given angle variables, a Selsyn stator fixed with each driven gear, a Selsyn rotor operatively associated therewith, and a radial indicator device carried by the rotor.

2. A visual indicating device for a navigational system of the character described, comprising a cylindrical outer ring member, a support member diametrically bridging said ring member and secured thereto, a center shaft about which said cylindrical ring may rotate, a fixed gear upon said shaft and mounted in the center of said support member, a pair of idler gears oppositely located on said support member and meshing with said fixed gear, a driven gear outwardly of and meshed with each of said idler gears and rotatably mounted upon said support member; said fixed gear and driven gears having the same diameter, a Selsyn indicator having a rotor and a stator located coaxially with each of said driven gears and mounted on said support member, means for forming a radial beam of light from the rotor of each of said Selsyn indicators whereby said beam of light indicates the angular position of said indicator Selsyn rotor.

3. A visual direction indicating device for charts in a navigational system, comprising a stationary body including a center shaft, a support member rotatably mounted on said shaft, a Selsyn having a rotor and a stator, said stator mounted revolubly on said support member on an axis parallel to said shaft, a light conducting tube fixed with the rotor and passing centrally through said rotor and stator, a light source carried by said support at one end of the tube, a light reflecting housing at the opposite end of said tube for reflecting a beam of light radially from said tube across and toward a plane normal to the center shaft axis, a surface plat at said plane, and means for rotating said support member, and operative connections between said stationary part and said support responsive to rotation of the latter on said center shaft to orient the said stator directionally in a predetermined relation to said stationary body throughout said rotation of said support.

4. A visual direction indication device for defining a transient line across a plat surface in a navigational system of the character described, comprising a stationary body including a center shaft, a plat support revolubly mounted in a plane normal to the shaft for rotation around the shaft in said plane, a stationary center gear on the shaft adjacent said support, a pair of planetary gears of the same diameter as said center gear revolubly mounted at opposite parts of said support, respective idler gears revoluble on said support meshed with the center gear and the respective planetary gears, a Selsyn for each planetary gear having a stator coaxial with and fixed with the planetary gear spaced from said plane, and having a concentric rotor, an axial member extended from the rotor through the planetary gear and beyond said plane, means including said extension to form a light beam from the rotor axis without said plane and thereto ward and along the plane so as to illuminate a line area on the surface of a plat surface when mounted on said support, a base gear on said support concentric with the center shaft, and means to drive said gear alternatively in opposite directions.

5. The structure of claim 4 wherein said means to form a light beam includes a light source on the axis of the planetary gear remote from the said plane, said extension from the rotor being a light conducting shaft fixed with the rotor extending revolubly through the planetary gear and said plane a distance, and a reflector fixed on the extension constructed to reflect a beam inwardly toward and along the plane a distance.

6. The structure of claim 5 including a plat surface fixed with said support substantially coincident with said plane, a base gear fixed with the support concentric with said center shaft, a pinion on said body meshed with the base gear, means to operate the pinion alternatively in opposite directions, and an indicator card fixed on each planetary gear around said light conducting shaft closely over said plat surface, each card being characterized to indicate its angular movement around its axis relatively to said support and plat.

7. The invention of claim 6 in which said plat surface is marked with a base line coincident with the axes of the said cards, each card being circular and formed with a peripheral scale of degrees azimuth, the zeros of both scales being coincident with a predetermined permanent direction.

LLEWELLYN G. DUGGAR.

REFERENCES CITED

The following references are of record in the file of this patent:

UNITED STATES PATENTS

| Number | Name | Date |
|---|---|---|
| 1,972,889 | Hayes | Sept. 11, 1934 |
| 2,027,528 | Hammond | Jan. 14, 1936 |
| 2,127,415 | Marique | Aug. 16, 1938 |
| 2,299,083 | Elm | Oct. 20, 1942 |
| 2,361,956 | Mosely | Nov. 7, 1944 |
| 2,433,860 | McDowell | Jan. 6, 1948 |